March 29, 1949.    J. K. HOLBROOK    2,465,453
FILM CUTTER

Filed July 17, 1945    3 Sheets-Sheet 1

INVENTOR
John K. Holbrook.
BY
ATTORNEY

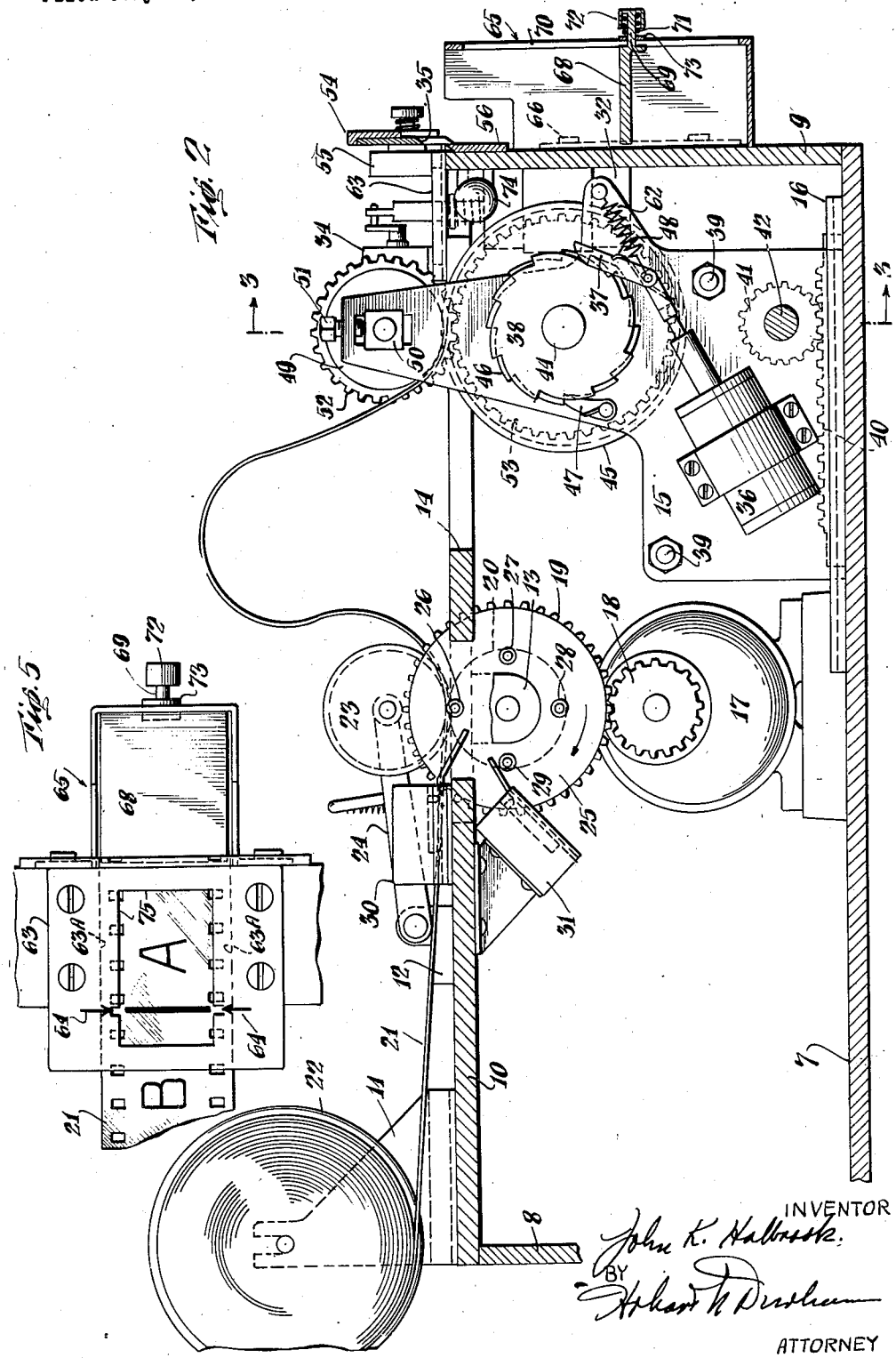

March 29, 1949. J. K. HOLBROOK 2,465,453
FILM CUTTER
Filed July 17, 1945 3 Sheets-Sheet 3
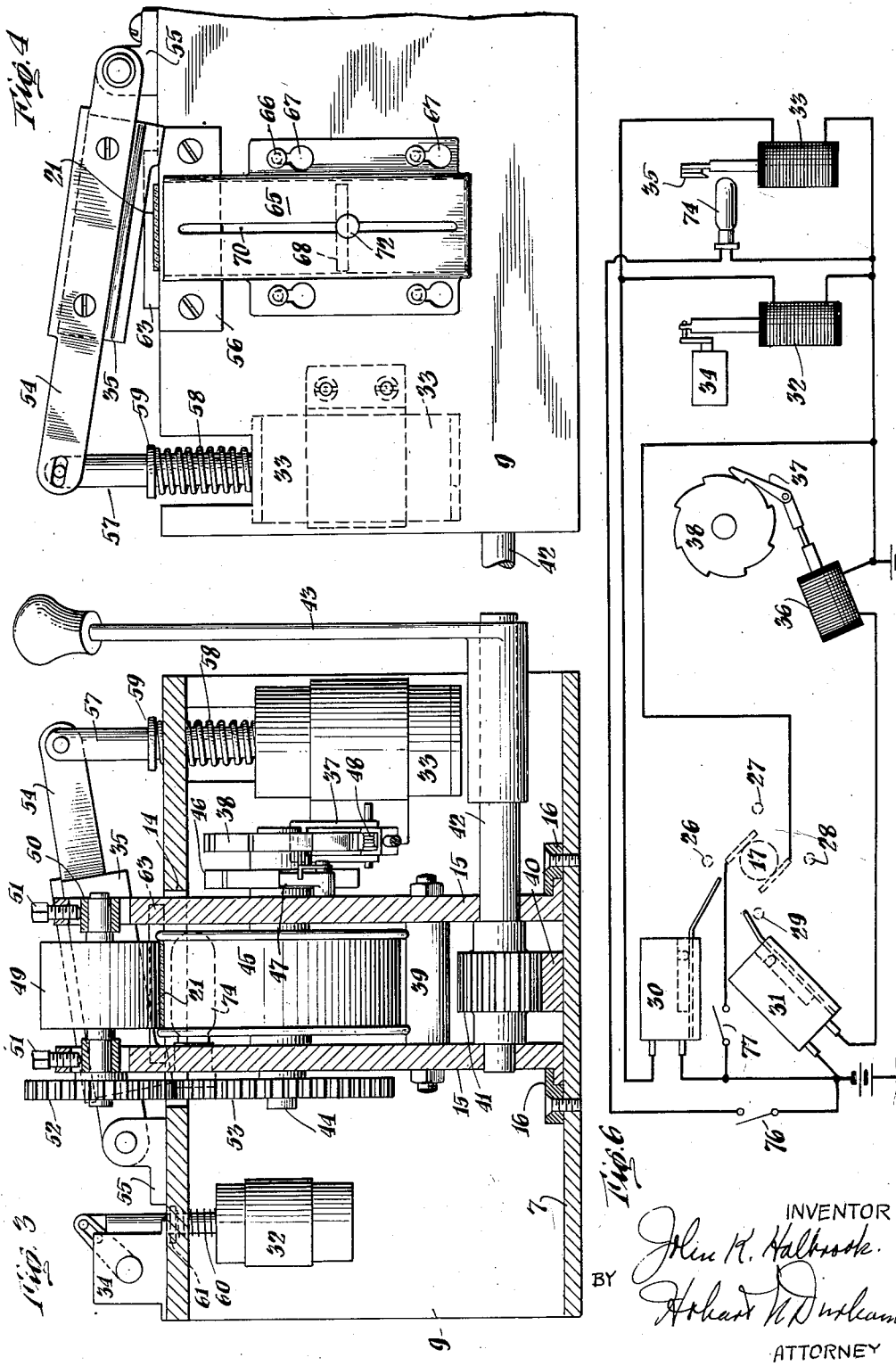
INVENTOR
John K. Holbrook
BY
Hobart K. Dunham
ATTORNEY Patented Mar. 29, 1949

2,465,453

UNITED STATES PATENT OFFICE 2,465,453

FILM CUTTER

John K. Holbrook, New York, N. Y., assignor to Holbrook Microfilming Service Inc., New York, N. Y., a corporation of Delaware Application July 17, 1945, Serial No. 605,497

7 Claims. (Cl. 164—42)

The present invention relates to a film cutting apparatus and refers more particularly to a device for rapidly separating a strip of photographic film into pieces accurately comprising the "frames" or exposed and developed pictures constituting the strip. The device has its principal application in the severing of long strips of motion picture film and is capable of severing approximately 7200 frames per hour.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a section along the line 2—2 of Figure 1;

Figure 3 is a section along the line 3—3 of Figure 2;

Figure 4 is a side elevation of the device;

Figure 5 is a detail view of a portion of Figure 1, and

Figure 6 is a wiring diagram.

Figure 1:
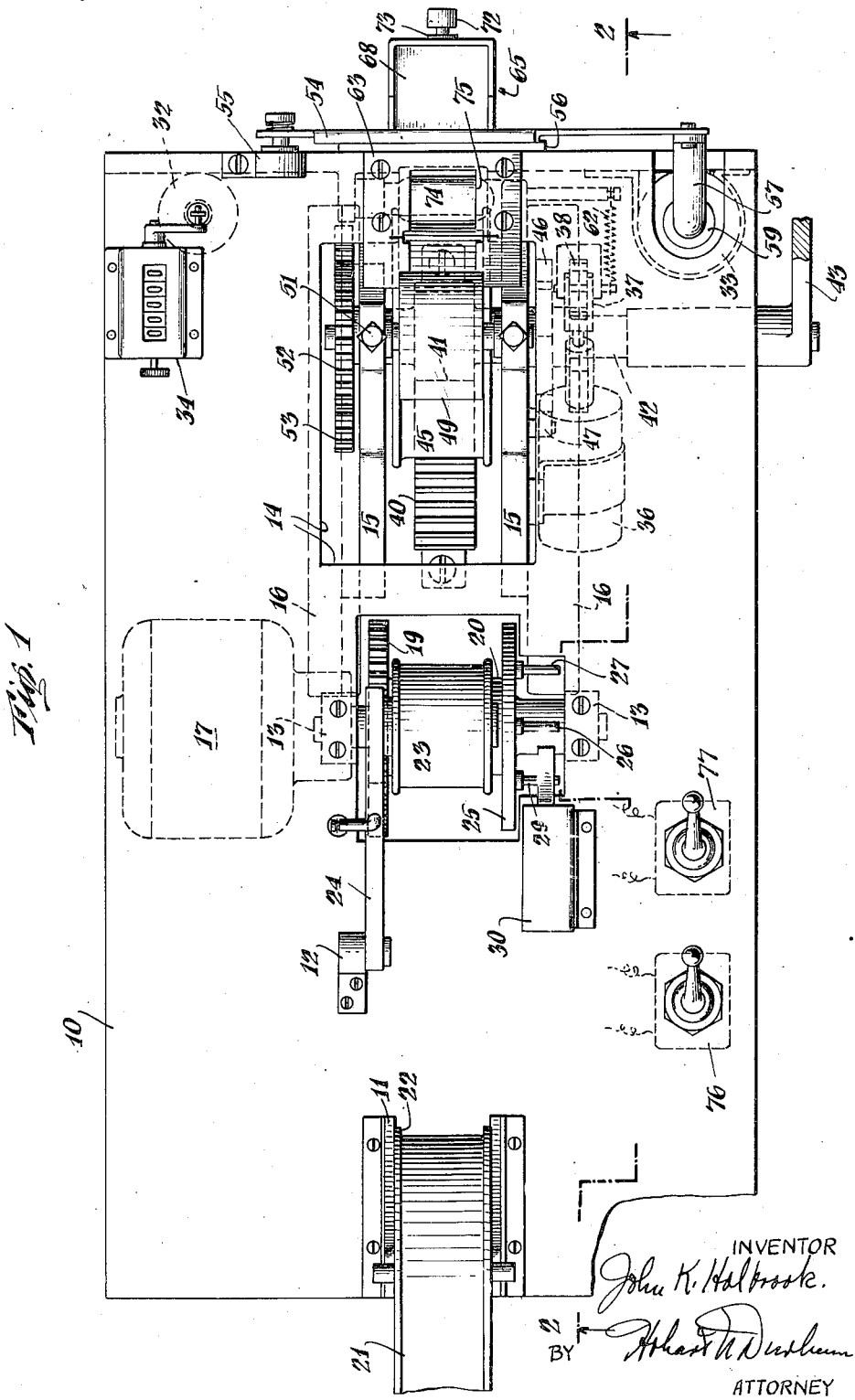
Figure 1 is a plan view of a device embodying the invention.

In accordance with the illustrative embodiment of the present invention there is provided in fixed relation to a film supply reel and common supporting means a continuously operative film feeding means feeding film to an intermittently operative film feeding means feeding the film to the cutting knife which is pivotally mounted on the supporting means for reciprocation in a fixed vertical plane. At a multiple of the length of a frame from the plane of the knife, an element of the device carries prominent witness marks and illumination from below permits inspection of the film for registry of the narrow inter-frame space with the witness marks. Registry is maintained by successive minute adjustments of the intermittent feeding means longitudinally of the support means by means of a manually operated rack and pinion.

In operation both film supply means feed the film forward at a rate slightly less than would be necessary to have the cuts register with the inter-frame spaces, perfect registry being maintained by the operator who while continually scanning the witness mark and inter-frame spaces for registry slowly moves the intermittent feed means bodily forward, the particular rate of forward movement being governed by the contemporaneous observation of how the spaces are registering with the mark. When the intermittent means reaches the forward limit of its movement it is quickly returned to the rear limit thereof, such movement serving to withdraw the film from the knife which makes one stroke in empty air, giving the operator time to re-establish registry, whereupon the operation continues as before.

It will be understood that the foregoing general description and the following detailed description as well are exemplary and explanatory of the invention but are not restrictive thereof.

Referring now in detail to the illustrative embodiment of the invention as shown in the accompanying drawings, the framework or supporting means of the device comprises the base member 7, end members 8, 9 and platform 10, the latter fixedly supporting the film supply spool standard 11 and standards 12, 13 of the continuous film feed mechanism and being formed with an aperture 14 through which the standards 15 of the intermittent film feed mechanism project, the latter being held in sliding contact with base 7 by flanged guide rails 16.

A small electric motor 17 with a reducing head and mounted on base 7 drives through gears 18, 19 the steady or continuous film feed roll 20 mounted in standards 13, the film 21 being drawn from supply spool 22 on standard 11 and being held against roll 20 by pressure roll 23 pivotally mounted on arm 24 in standard 12. The engagement of rolls 20, 23 with the film is preferably frictional.

A timing disc 25 mounted on the shaft of roll 20 carries four pins 26, 27, 28, 29 equidistantly and equi-angularly disposed about its center and micro-switch 30 is mounted on platform 10 in such relation to disc 25 as to be tripped by a pin, for instance pin 26 just before a second micro-switch 31 also mounted on platform 10, is tripped by the next pin, for instance pin 29. Switch 30 controls solenoids 32 and 33 connected respectively to counter 34 and knife 35. Switch 31 controls solenoid 36 connected by pawl 37 to ratchet 38 of the intermittent film feed mechanism.

Standards 15 of the intermittent feed mechanism are maintained in parallel vertical relation by spacer bars 39. A toothed rack 40 mounted on base 7 extends between standards 15 and parallel thereto and is engaged by a pinion 41 mounted on register shaft 42 journalled in standards 15 and controlled by handle 43.

Shaft 44 journalled in standards 15 carries intermittent feed roll 45 and ratchets or click wheels 46, 38, the latter being engaged by pawl 37 for clockwise rotation of roll 45, the former being engaged by pawl 47 to prevent counter clockwise rotation thereof which might be caused by pawl 37 climbing the back of the teeth of ratchet 38. Spring 48 maintains pawl 37 in engagement with ratchet 38. The ratchets engage shaft 44 frictionally, ratchet 38 having more friction, so that in case of loss of loop, pawl 37 may be manually disengaged and ratchet 38 and shaft 44 revolved counter-clockwise manually in order to restore the loop, without stopping to disengage pawl 47.

Pressure roll 49 is set in pillow blocks 50 in standards 15, the pillow blocks being vertically adjustable by means of screws 51. Roll 49 is driven by gear 52 engaging gear 53 on shaft 44.

Knife 35 is removably attached to knife arm 54 pivoted to standard 55. A complementary knife of cutting abutment 56 is removably attached to end plate 9. The free end of knife arm 54 is pivoted to armature 57 of solenoid 33, the armature being surrounded by a coil spring 58 abutting the solenoid body and a collar 59 on the armature for returning knife 35 to the illustrated position promptly upon the solenoid being deenergized. A similar spring 60 and collar 61 are utilized on solenoid 32 and an extension coil spring 62 analogously serves to return the armature of solenoid 36.

The register plate 63 bears oppositely disposed witness marks 64 which are located at a distance from the cutting plane of knife 35 equal to or a multiple of the distance between the center points of the frames or pictures of the film strip. Otherwise stated this center to center distance is equal to the length of a frame plus the length of the between-frame distance. A downward facing film channel 63A is formed on the lower surface of plate 63.

A product box 65 is supported on pins 66 on end plate 9 below knife 35, so as to catch the frames as they fall after being severed from the strip. This box is quickly removable by an upward movement which brings opposite the pin heads apertures 67 communicating with the slots engaging the pins. A follower plate 68 forms a vertically adjustable floor of the box, comprising a pin 69 extending through vertical slot 70 in the box, pin 69 being surrounded by a coil spring 71 engaging a fixed cap 72 serving as a handle and a loose collar 73, the outward pressure of spring 71 being transmitted to cap 72 and through pin 69 to the plate portion 68 which frictionally engages the inner surface of box 65 to maintain any position to which it is set.

A lamp 74 is located below the film viewing aperture 75 of register plate 63 and is controlled by switch 76. Switch 77 controls motor 17 and, through pins 26, 27, 28, 29 actuated by the motor and actuating switches 30 and 31, also controls solenoids 32, 33 and 36.

In operation, a roll 22 of film is inserted in standards 11 and the film strip 21 manually introduced into the continuous and intermittent feed mechanisms, leaving a loop of film between the two feed mechanisms, all as shown in Figure 2. The lamp 74 is switched on and the blank space between frames A and B of the film is brought in registry with the witness marks 64 as shown in Figure 5, the registry being effected by movement of lever 43 which moves standards 15 longitudinally of base 7 in either direction. The dividing line between frames is shown as black because the film 21 is positive film, the images constituting the frames being omitted.

With the inter-frame area or space registered as above, the preceding area, that is, the one in advance of frame A, will lie directly under knife 35 which will bisect it longitudinally of strip 21, such bisection repeated in rapid succession being the object of the invention.

On closing switch 77 motor 17 drives continuous film feed roll 20 through gears 18 and 19, and timing disc 25 on the same shaft with roll 20 also rotates. In the position shown in Figure 2, pin 26 has just tripped switch 30, first closing and then opening the circuit to solenoids 32, 33, operating counter 34 and knife 35, and severing any blank film or fraction of a frame which may have preceded frame A. Pin 29 is about to trip switch 31 controlling solenoid 36 which through pawl 37 and ratchet 38 will advance film 21 an amount slightly less than the distance between frame centers. This will advance frame A almost totally beyond knife 35, and the amount by which the advance falls short of the distance between frame centers will appear as the amount by which the inter-frame area following frame B falls short of registering with the witness marks 64. The operator has the comparatively long interval required by pin 29 to travel to a position of contact with switch 30, in which to bring the inter-frame area into registry with the witness marks. Frame A is thereupon severed and falls to floor 68 of product box 65. In practical operation, with the knife falling twice a second or better for an average production approximating 7200 cut frames per hour, there is a tendency of the inter-frame area to recede slowly leftward from the witness marks and the operators only duty is to check this tendency by a slow movement to the right of handle 43, the rate of movement of handle 43 being selected and continually checked by contemporaneous observation of the registry.

The operator will periodically find the handle 43 has reached the right or forward limit of its movement. It must then be quickly returned to the left limit of movement and registry once more established. The quick leftward return of handle 43 has withdrawn the frame which was beyond the knife to a position not quite as far advanced as frame A and the knife makes one stroke in empty air, providing the time necessary to re-establish registry.

At the beginning of the operation the follower plate 68 will be near the top of box 65 to constitute a high false bottom to which the cut frames may fall without danger of turning upside down or otherwise becoming disarranged. This bottom will be periodically lowered as the box fills up, until when it is all the way down and the box 65 is full, the box is lifted upward and outward off pins 66 and replaced with a duplicate box.

The invention in its broader aspects is not limited to the specific mechanisms shown and described but departures may be made therefrom within the scope of the accompanying claims without departing from the principles of the invention and without sacrificing its chief advantage.

What is claimed is:

1. A device for severing the frames from a strip of film or the like comprising the combination with film cutting means operable in a fixed plane, intermittent film feeding means and film viewing means, of means operable simultaneously with said viewing means for varying the distance of said feeding means from said plane.

2. A device for severing the frames from a strip of film or the like comprising the combination with film cutting means operable in a fixed plane, intermittent film feeding means and film viewing means, of means operable contemporaneously with said viewing means for varying the distance of said feeding means from said plane.

3. A device for severing the frames from a strip of film or the like comprising the combination with film cutting means operable in a fixed plane and film feeding means, of means for continuously observing the registry of successive inter-frame areas of said strip with said plane and means contemporaneously operable with said last mentioned means of varying the distance between said feeding and said cutting means.

4. A device for severing the frames from a strip of film or the like comprising, in combination, a base member, a platform supported in substantially parallel relation thereto, means mounted on said platform for rotatably supporting a supply reel of film or the like, continuous film feed means mounted on said platform, intermittent film feed means slidably mounted on said base member and projecting through an aperture formed in said platform, film cutting means mounted on said platform and operable in a fixed plane substantially perpendicular thereto, a register plate mounted on said platform between said intermittent feed means and said cutting means and comprising a witness mark, said mark being separated from said plane by a distance equal to a multiple of the distance between the centers of successive frames, and rack and pinion means connected to said base member and said intermittent feed means for varying the distance of the latter from said plane.

5. In a device according to claim 4, a timing disc connected to said continuous feed means and switch means in operative relation to said disc connected to actuating means for said intermittent feed means and said cutting means.

6. In a device according to claim 4, a timing disc connected to said continuous feed means, said disc comprising pins mounted thereon, and switches connected to said intermittent feed means and said cutting means and so related to said pins as to operate said cutting means and to operate said intermittent feed means relatively shortly thereafter.

7. In a device according to claim 4, said intermittent feed means comprising two ratchets, one of said ratchets being engaged by a pawl to rotate said means to advance said film, the other of said ratchets being engaged by another pawl to prevent reverse rotation of said means, said ratchets engaging the shaft of said means frictionally, the friction between said first ratchet and said shaft being greater than between said other ratchet and said shaft.

JOHN K. HOLBROOK.

REFERENCES CITED

The following references are of record in the file of this patent:

UNITED STATES PATENTS

| Number | Name | Date |
| --- | --- | --- |
| 1,037,675 | Simpson | Sept. 3, 1912 |
| 1,474,748 | White | Nov. 20, 1923 |
| 1,684,617 | Biggert | Sept. 18, 1928 |
| 2,021,064 | Heygel | Nov. 12, 1935 |
| 2,188,871 | Broekhursen | Jan. 30, 1940 |
| 2,275,064 | Moore | Mar. 3, 1942 |